United States Patent
Su

(10) Patent No.: US 6,711,782 B1
(45) Date of Patent: Mar. 30, 2004

(54) DUPLEX OPPOSITE FRICTION HINGE

(75) Inventor: Ding-Hone Su, Hsi-Chih (TW)

(73) Assignee: Sinher Technology Inc., Taipei Hsien (TW)

( * ) Notice: Subject to any disclaimer, the term of this patent is extended or adjusted under 35 U.S.C. 154(b) by 0 days.

(21) Appl. No.: 10/307,944

(22) Filed: Dec. 3, 2002

(51) Int. Cl.⁷ .............................................. E05D 11/08
(52) U.S. Cl. ........................... 16/342; 16/340; 16/337; 16/356
(58) Field of Search ........................ 16/342, 340, 337, 16/355, 356, 386, 387; 403/297, 300, 86, 91, 103, 104, 109, 290, 146, 119–121; 248/900, 917, 923; 361/680–683

(56) References Cited

U.S. PATENT DOCUMENTS

| | | | | |
|---|---|---|---|---|
| 5,713,672 A | * | 2/1998 | Lu | 384/289 |
| 5,894,635 A | * | 4/1999 | Lu | 16/342 |
| 6,317,927 B1 | * | 11/2001 | Lai et al. | 16/342 |
| 6,336,252 B1 | * | 1/2002 | Bando | 16/307 |
| 6,588,062 B2 | * | 7/2003 | Novin et al. | 16/342 |

FOREIGN PATENT DOCUMENTS

| | | | |
|---|---|---|---|
| JP | 10-47337 | * | 2/1998 |
| JP | 11-247840 | * | 9/1999 |
| JP | 2000-66762 A | * | 3/2000 |
| JP | 2003-269437 A | * | 9/2003 |
| WO | WO 95/16094 | * | 6/1995 |

* cited by examiner

*Primary Examiner*—Chuck Y. Mah
(74) *Attorney, Agent, or Firm*—Birch, Stewart, Kolasch & Birch, LLP

(57) ABSTRACT

A duplex opposite friction hinge adopted for extending a notebook computer or an article which has a lid as desired includes an axle member, a first rotary member which has a first rotary section to couple with the axle member, and a second rotary member which has a second rotary section encasing the first rotary section. The first rotary section and the second rotary section are extended to form a first fastening section and a second fastening section. The first fastening section and the second fastening section correspond to each other and are located transversely on the center of the axle member.

5 Claims, 6 Drawing Sheets

DUPLEX OPPOSITE FRICTION HINGE

FIELD OF THE INVENTION

The present invention relates to a duplex opposite friction hinge and particularly a duplex opposite friction hinge adopted for use on notebook computers, computer screens or articles which have a lid for adjusting the extending angle.

BACKGROUND OF THE INVENTION

The notebook computers or handheld computers now being widely used have a display screen connecting to the computer processor through an axle coupling means. When in use, the display screen is flipped and extended. When not in use, the display screen may be folded to the computer processor to become a smaller size to facilitate storing and carrying.

In order to improve the convenience of use, it is generally required that the axle coupling means be adjustable in a stepless manner and be extended and anchored at a desired angle. The most commonly used axle coupling means for connecting the display screen and the computer processor is hinge. Referring to FIG. 1, a conventional hinge includes an axle 1' and a rotary member 2' coupling with the axle 1'. When in use, applying a force on the rotary member 2', the friction force between the axle 1' and the rotary member 2' may be used to control the folding angle. The turning relationship between the axle 1' and the rotary member 2' may be that the axle 1' remains stationary while the rotary member 2' is turned, or the rotary member 2' remains stationary while the axle 1' is turned. Either way, such a structure occurs a metal friction loss during turning. The single piece rotary member 2' tends to occur metal fatigue after being turned reciprocally and repeatedly for a long period of time. As a result, the gap between the axle 1' and the rotary member 2' increases, and the display screen could become wobbling and cannot be anchored steadily when extended. In serious situations, the rotary member 2' might even fracture. Moreover, to increase the strength of the rotary member 2', the elasticity suffers and the impact of torque resulting from the dimension error becomes greater and adjustment of the hinge becomes difficult and service life of the hinge also suffers. On the other hand, reducing the strength of the rotary member 2' may increase the elasticity, but metal fatigue is easier to take place and the torque decreases. Hence in practice it is difficult to achieve a proper balance between the strength and the elasticity of the rotary member 2'.

SUMMARY OF THE INVENTION

Therefore the primary object of the invention is to resolve the aforesaid disadvantages. The invention provides two rotary members coupling with the axle in the opposite directions. The fastening sections (where the force is applied) are located transversely on the center line of the axle so that the two rotary members can provide same amount of friction forces. Thus when the hinge is turned in different directions, no adjustment error occurs.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
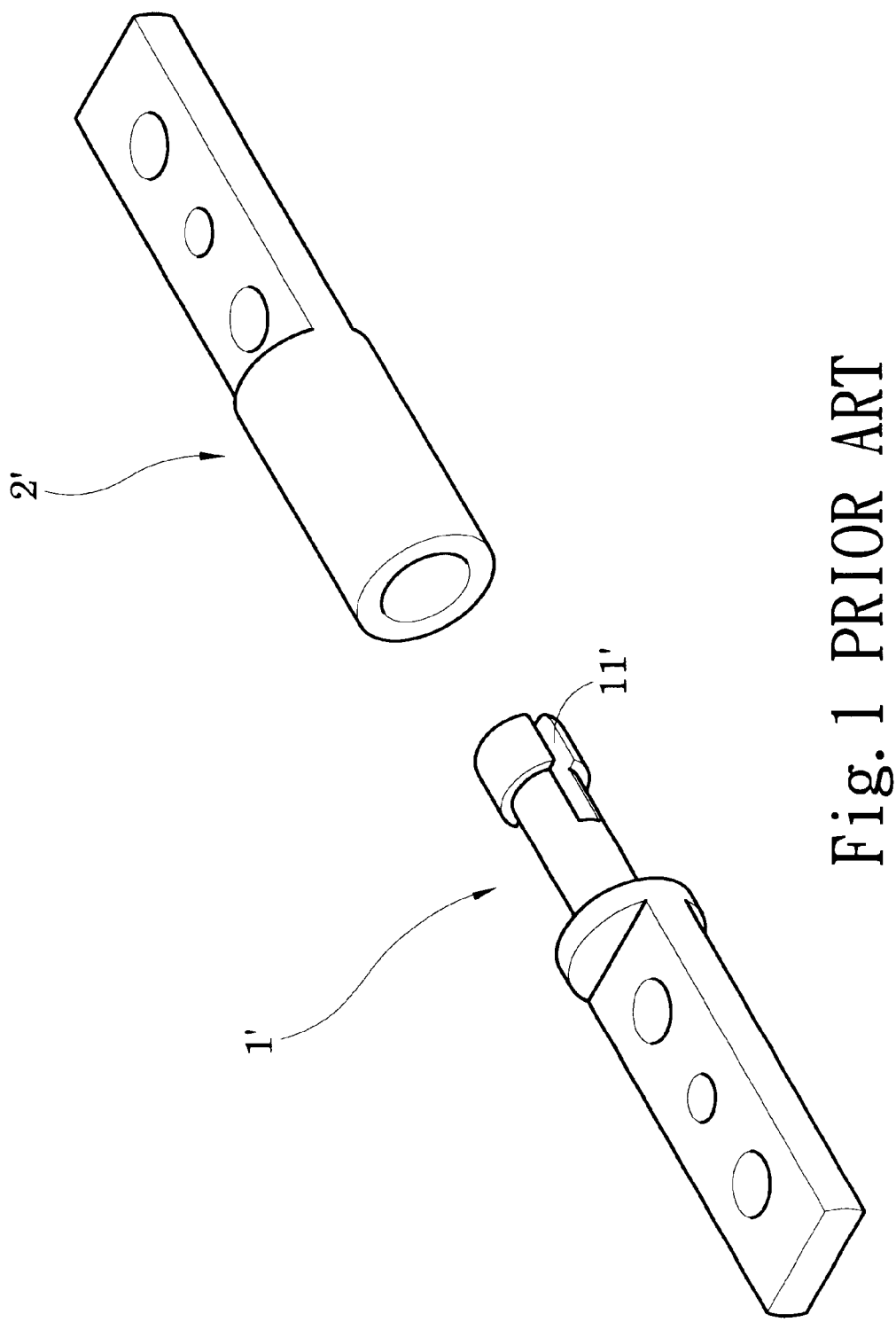
FIG. 1 is a perspective view of a conventional hinge.
Figure 2:
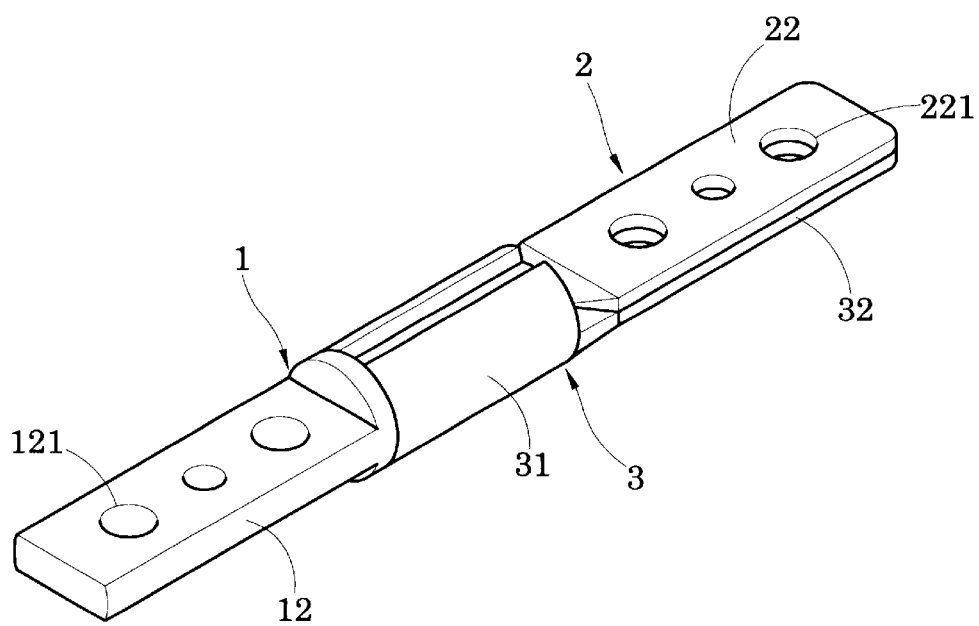
FIG. 2 is a perspective view of the invention.
Figure 3:
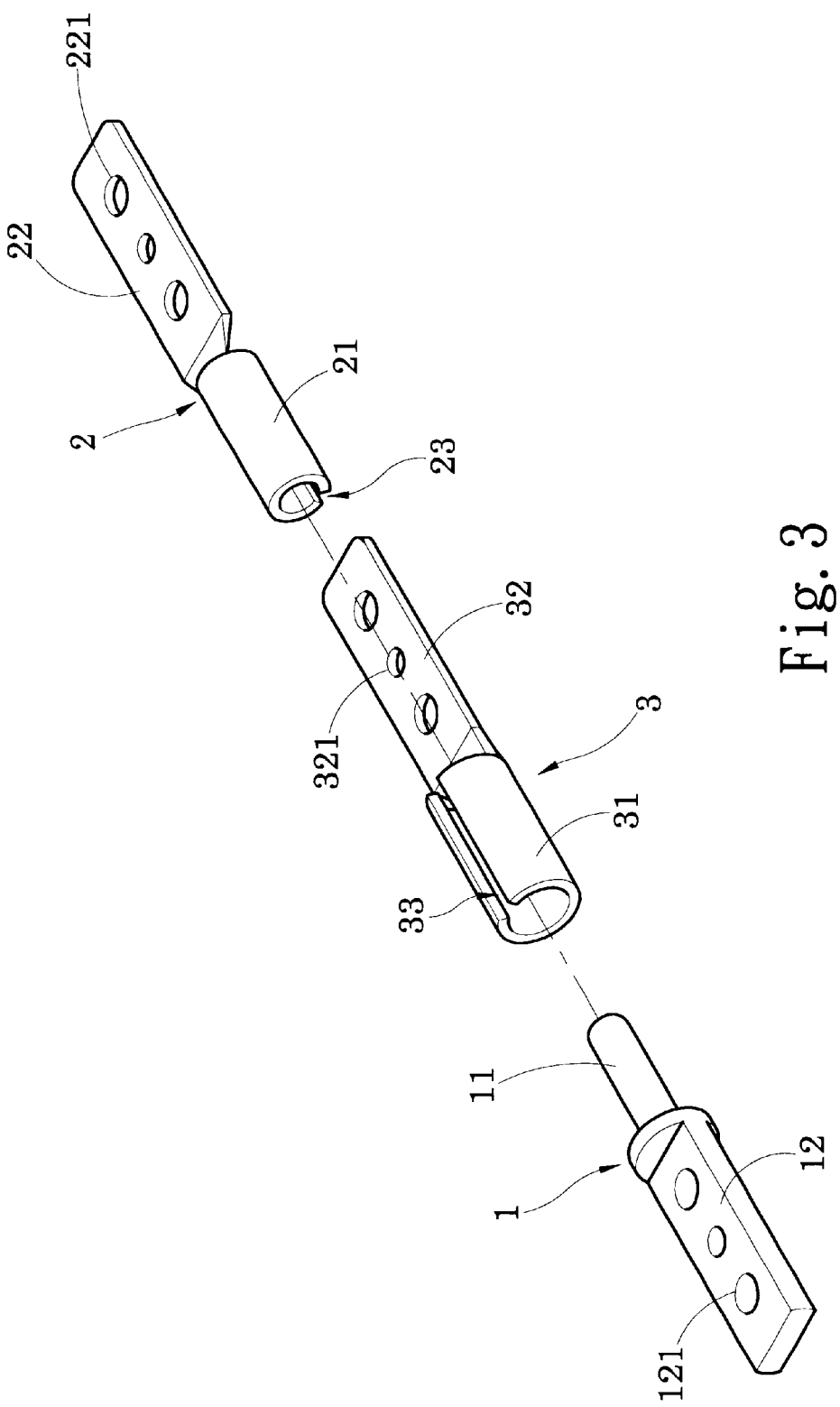
FIG. 3 is an exploded view of the invention.

Referring to FIGS. 2 and 3, the duplex opposite friction hinge of the invention is adopted for use on notebook computers or articles having a lid for extending as desired. It includes an axle member 1 which has an axle 11 and a connection section 12 extending in the direction opposite to the axle, a first rotary member 2 which has a first rotary section 21 coupling with the axle member 1, and a second rotary member 3 which has a second rotary section 31 encasing the first rotary section 21. The first rotary section 21 is an arched plate bent to form a first opening 23. The second rotary section 31 also is an arched plate bent to encase the first rotary section 21 and form a second opening 33 opposing the first opening 23. The connection section 12 has connection holes 121 formed thereon. The first rotary section 21 and the second rotary section 31 are extended respectively to form a first fastening section 22 and a second fastening section 32 corresponding to each other and are located transversely on the center line of the axle member 1, and have respectively fastening holes 221 and 321 corresponding to each other for fastening to the article to be extended (such as a notebook computer, computer screen or article with a lid). In addition, the first and the second rotary members 2 and 3 are made from elastic or tough plates that may be of different thickness to achieve smooth turning and required strength.

Figure 4A:
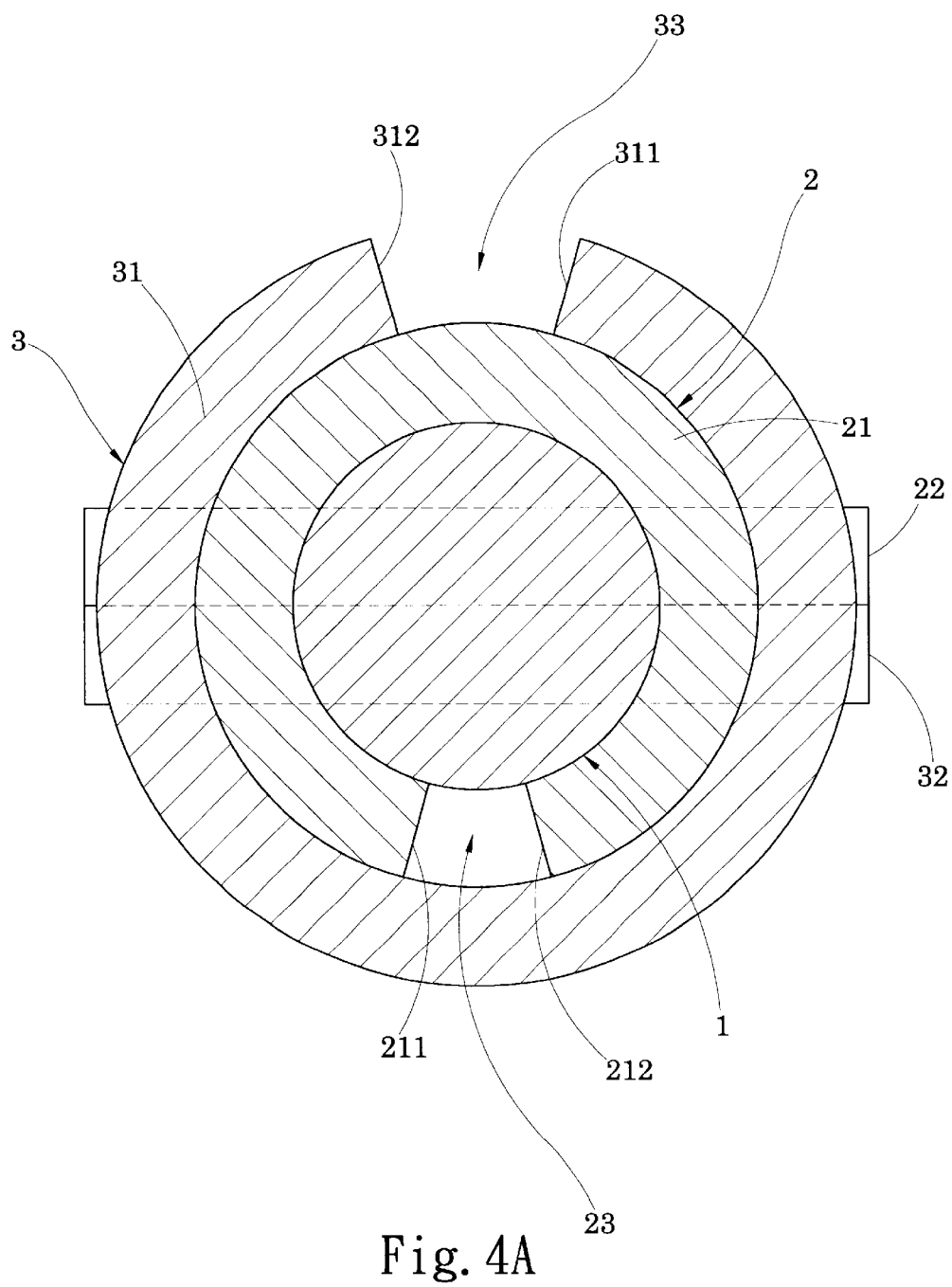
FIGS. 4A, 4B and 4C are schematic views of the invention in various operating and adjusting conditions.
Figure 4B:
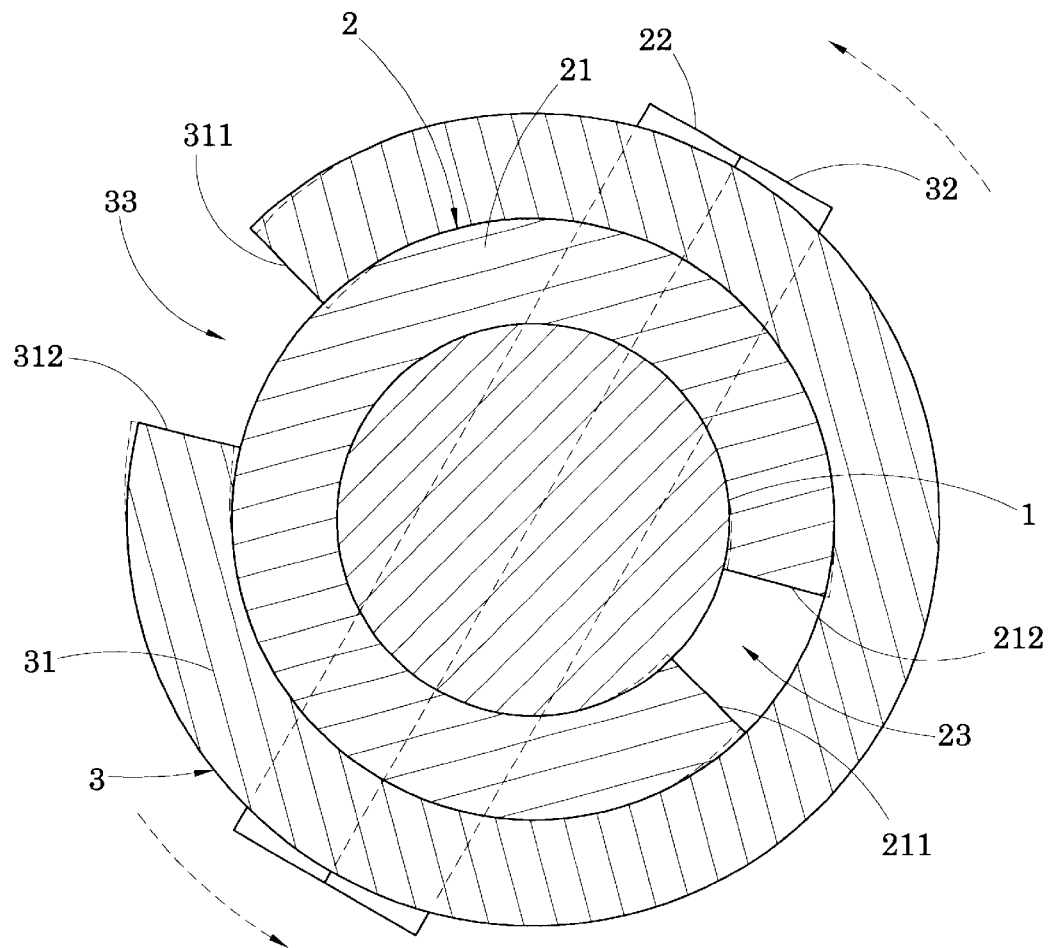
Figure 4C:
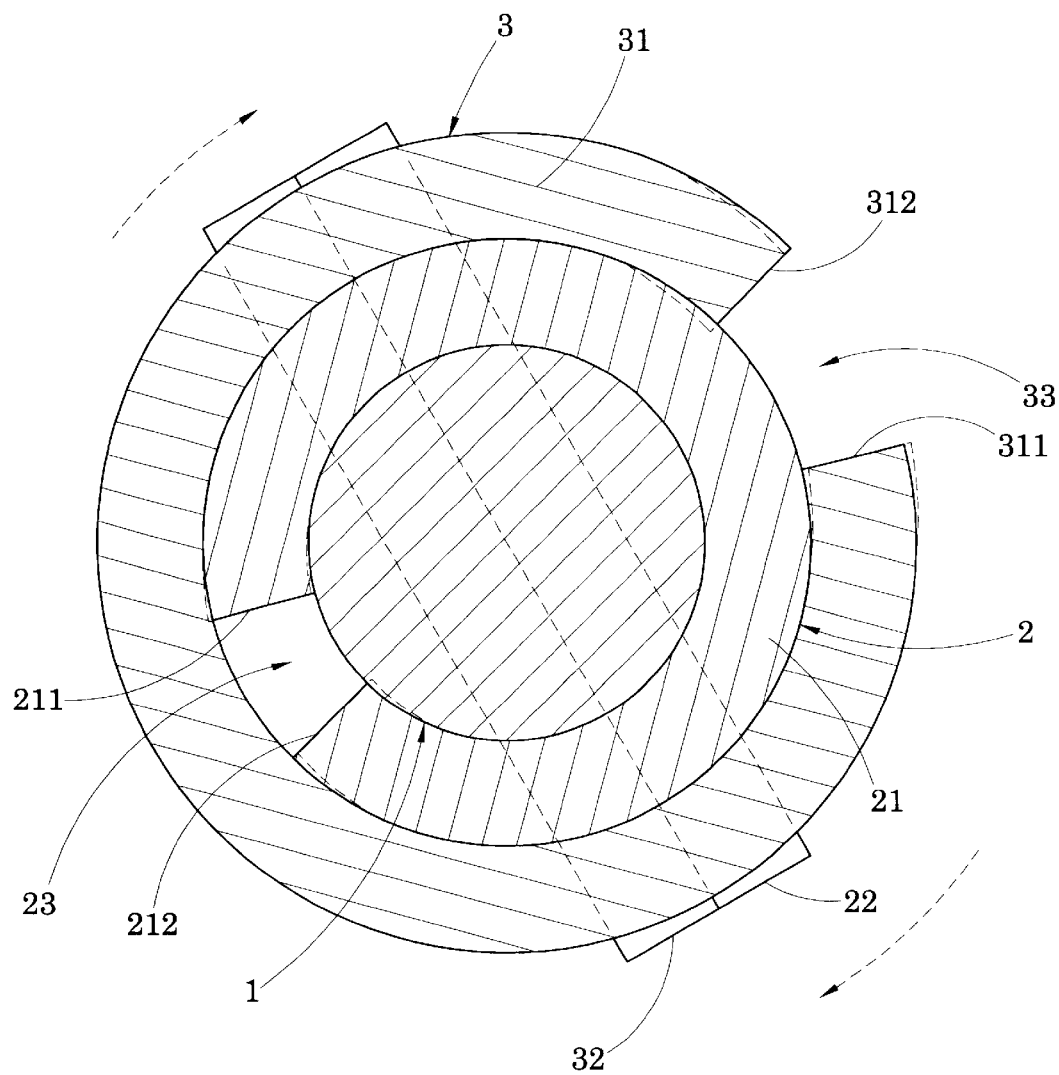

Referring to FIGS. 4A, 4B and 4C, the first opening 23 of the first rotary section 21 has two sides formed respectively a first action zone 211 and a second action zone 212. The second opening 33 of the second rotary section 31 has two sides formed respectively a third action zone 311 and a fourth action zone 312. When in use and a force is applied to turn the first and second fastening sections 22 and 32 in the counterclockwise direction, the first and the second rotary sections 21 and 31 are turned in the counterclockwise direction. The first opening 23 also is turned in the counterclockwise direction. As the first and the second rotary members 2 and 3 are elastic or tough plates, the first action zone 211 generates a closing effect due to compression and the second action zone 212 generates an opening effect due to tension. Meanwhile, the second opening 33 also is turned in the counterclockwise direction, and the third action zone 311 generates a closing effect due to compression and the fourth action zone 312 generates an opening effect due to tension. In terms of structure (not shown in the drawings), the first action zone 211 and the second action zone 212 of the first rotary member 2 provide respectively a friction force of compression and tension, while the third action zone 311 and the fourth action zone 312 of the second rotary member 3 provide respectively a friction force of compression and tension. Thus during turning in the counterclockwise direction, the first rotary member 2 and the second rotary member 3 provide opposite frictions of compression and tension. As the rotary members provide same amount of friction forces, no error occurs during the adjustment.

When a force is applied to turn the first and second fastening sections 22 and 32 in the clockwise direction, the first and the second rotary sections 21 and 31 are turned in the clockwise direction. The first opening 23 is turned in the clockwise direction. As the first and the second rotary members 2 and 3 are elastic or tough plates, the first action zone 211 generates an opening effect due to tension and the second action zone 212 generates a closing effect due to compression. Meanwhile, the second opening 33 also is turned in the clockwise direction, and the third action zone 311 generates an opening effect due to tension and the fourth action zone 312 generates a closing effect due to compression. In terms of structure (not shown in the drawings), the first action zone 211 and the second action zone 212 of the first rotary member 2 provide respectively a friction force of tension and compression, while the third action zone 311 and the fourth action zone 312 of the second rotary member 3 provide respectively a friction force of tension and compression in the clockwise direction. The first rotary member 2 and the second rotary member 3 all provide compression friction and tension friction. To sum up the previously discussions, the force receiving condition of various action zones may be different due to different force directions, but as the fastening section (force applying portion) are located transversely on the center of the axle, the friction forces provided by the rotary members are the same. The friction forces are also the same even when the rotary members are turned in different directions. Therefore the lifting angle of the structure may be adjusted more accurately.

The improved duplex opposite friction hinge of the invention enables various rotary members to provide tension friction and compression friction, and increase the service life of the product, and through locating the fastening section (force applying potion) transversely on the center of the axle, the two rotary members can provide same amount of friction force. Thus when the hinge is turned in different directions, no error occurs to the adjustment.

While the preferred embodiment of the invention has been set forth for the purpose of disclosure, modifications of the disclosed embodiment of the invention as well as other embodiments thereof may occur to those skilled in the art Accordingly, the appended claims are intended to cover all embodiments which do not depart from the spirit and scope of the invention.

What is claimed is:

1. A duplex opposite friction hinge adopted for extending a notebook computer or an article which has a lid as desired, comprising:

an axle member having an axle and a connection section extending in a direction opposite to the axle;

a first rotary member having a first rotary section to couple with the axle, the first rotary section being an arched plate bent to form a first opening; and an arched second rotary member made of a plate having a second rotary section encasing the first opening of the first rotary section, the second rotary section having a second opening opposing the first opening, the first rotary section and the second rotary section being extended respectively to form a first fastening section and a second fastening section corresponding to each other and being located transversely on the center axis of the axle member;

wherein the first rotary member and the second rotary member provide respectively a friction force required for turning in different directions, and the rotary members form an opening or a closing condition relative to the axle member depending on the direction of forces being applied.

2. The duplex opposite friction hinge of claim 1, wherein the first and the second fastening sections have fastening holes corresponding to each other.

3. The duplex opposite friction hinge of claim 1, wherein the connection section has connection holes formed thereon.

4. The duplex opposite friction hinge of claim 1, wherein the first rotary member and the second rotary member are selectively made from an elastic or a tough material.

5. The duplex opposite friction hinge of claim 1, wherein the first rotary member and the second rotary member have different thickness and correspond to each other.

* * * * *